(12) United States Patent
Ou

(10) Patent No.: US 9,962,872 B2
(45) Date of Patent: May 8, 2018

(54) TOOL AND COATING METHOD THEREOF

(71) Applicant: Yu-Hua Ou, Taichung (TW)

(72) Inventor: Yu-Hua Ou, Taichung (TW)

( * ) Notice: Subject to any disclaimer, the term of this patent is extended or adjusted under 35 U.S.C. 154(b) by 396 days.

(21) Appl. No.: 14/699,744

(22) Filed: Apr. 29, 2015

(65) Prior Publication Data

US 2016/0318223 A1 Nov. 3, 2016

(51) Int. Cl.
*B29C 45/16* (2006.01)
*B25G 1/10* (2006.01)
*B29L 31/28* (2006.01)
*B29C 45/14* (2006.01)
*B29L 31/00* (2006.01)

(52) U.S. Cl.
CPC .......... *B29C 45/1671* (2013.01); *B25G 1/105* (2013.01); *B29C 45/14549* (2013.01); *B29K 2995/0021* (2013.01); *B29L 2031/283* (2013.01); *B29L 2031/722* (2013.01)

(58) Field of Classification Search
CPC .......... B29C 45/1671; B29C 45/14336; B29C 45/14549; B25G 1/105; B25G 1/12; B25G 1/125; B29K 2995/0021; B29L 2031/283; B29L 2031/722
See application file for complete search history.

(56) References Cited

U.S. PATENT DOCUMENTS

| 6,345,556 B1 * | 2/2002 | Lin | B25G 1/105 81/177.1 |
| 2004/0221425 A1 * | 11/2004 | Lawless | B25B 33/00 16/430 |
| 2005/0115023 A1 * | 6/2005 | Lin | B25G 1/00 16/110.1 |
| 2006/0026800 A1 * | 2/2006 | Lawless | B25G 1/105 16/430 |
| 2006/0236522 A1 * | 10/2006 | Lin | B21D 53/70 29/527.2 |
| 2010/0180400 A1 * | 7/2010 | Pell | B25G 1/10 16/110.1 |
| 2011/0259161 A1 * | 10/2011 | Liao | B25B 15/02 81/436 |

FOREIGN PATENT DOCUMENTS

TW 564216 B 12/2003

* cited by examiner

*Primary Examiner* — Christopher M Koehler
*Assistant Examiner* — Joel Crandall
(74) *Attorney, Agent, or Firm* — Muncy, Geissler, Olds & Lowe PC

(57) ABSTRACT

A tool and a coating method thereof are provided. The tool includes: a main body including connected head and grip portions, an end of the grip portion being a tail portion; a first coating layer coated on the main body; a second coating layer, coated on the first coating layer continuously corresponding to the grip portion and protrudingly formed with a pattern portion, formed with a first flange formed radially corresponding to the tail portion; a third coating layer, at least coated on the second coating layer, the pattern portion being at least partially exposed. The coating method includes the following steps of: manufacturing a main body into a first product having the first coating layer; manufacturing the first product into a second product having the second coating layer; and manufacturing the second product into a tool having the third coating layer.

13 Claims, 9 Drawing Sheets

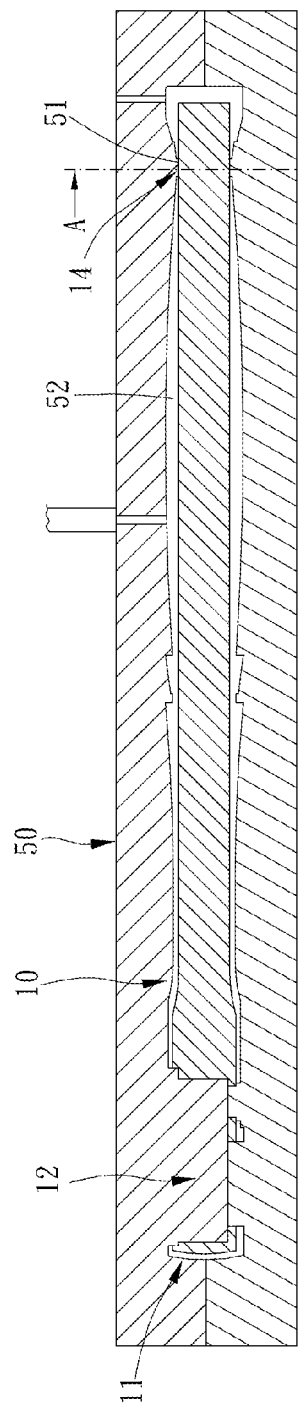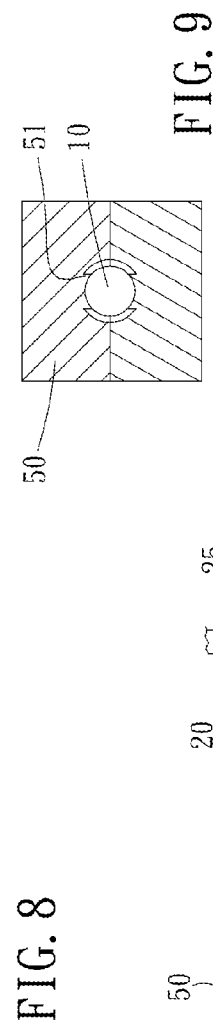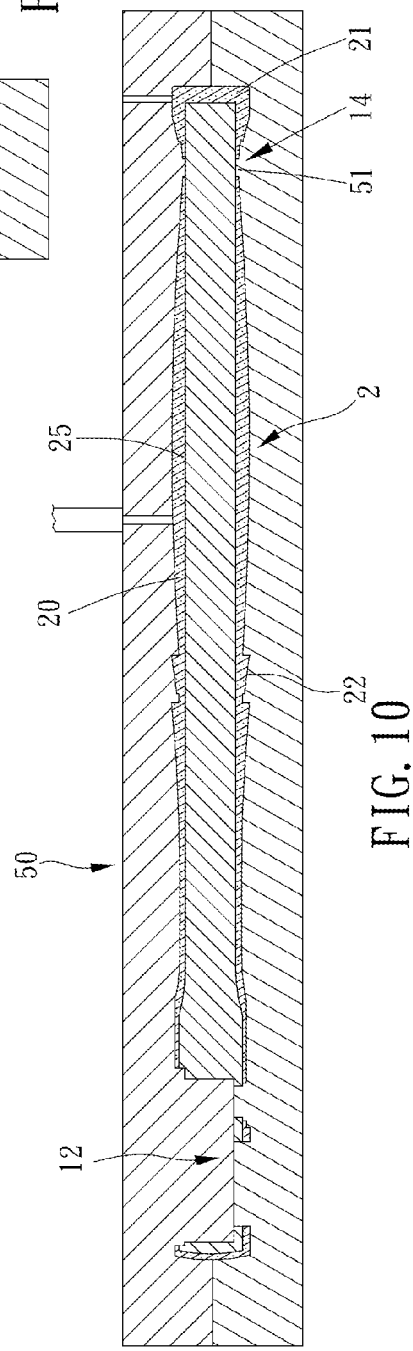

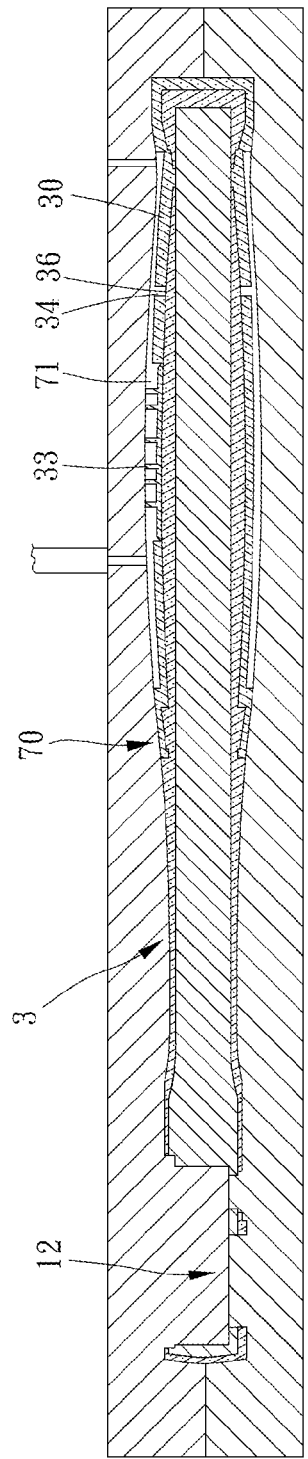
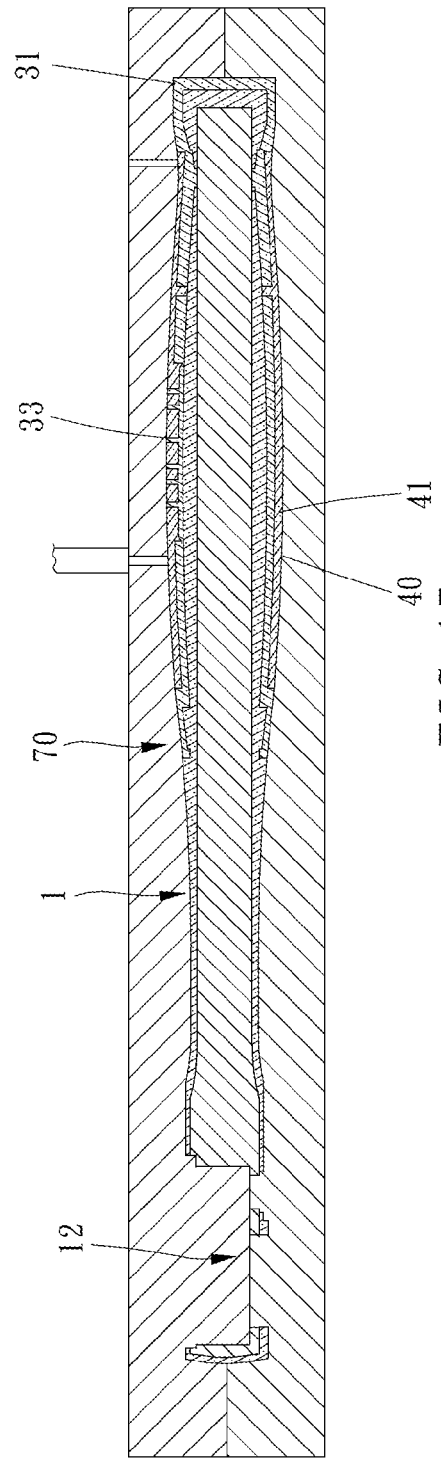

TOOL AND COATING METHOD THEREOF

BACKGROUND OF THE INVENTION

Field of the Invention

The present invention relates to a tool, and more particularly to a tool and a coating method thereof.

Description of the Prior Art

In a tool and a coating method thereof disclosed in TW564216, a plastic sleeve member is disposed around a center of a hand tool main body, and a grip sleeve is disposed around between an area near the plastic sleeve member and a tail portion of the hand tool main body; therefore, different color combinations of the plastic sleeve member and the grip sleeve create different visual perceptions.

However, the tool and the coating method thereof mentioned above present simple color variation with only two colors on a grip portion, so the tool and the coating method thereof is unable to produce complicated picture-text patterns. To present texts or patterns on the grip portion of the tool, a manufacturer usually prints the picture-text pattern by printing, but the picture-text pattern is usually abraded and becomes unrecognizable due to long-term use. In addition, in the tool and the coating method thereof, only the grip portion is coated, so a head portion is not protected; therefore, a metal surface becomes less beautiful after long-term use.

The present invention has arisen to mitigate and/or obviate the afore-described disadvantages.

SUMMARY OF THE INVENTION

The major object of the present invention is to provide a tool and a coating method thereof in which a first coating layer is coated on a tool more thoroughly to prevent a surface of a main body of the tool from being abraded. Furthermore, a pattern portion of the tool is formed on the second coating layer directly; therefore, after a third coating layer is coated on the second coating layer, an upper surface of the pattern portion is exposed. The pattern portion of the present invention is less abradable after long-term use.

To achieve the above and other objects, a tool of the present invention is provided, including: a main body, a first coating layer, a second coating layer and a third coating layer. The main body includes a head portion and a grip portion. An end of the grip portion is connected with the head portion, and the other end is a tail portion. The first coating layer is coated on the main body from the head portion to the tail portion continuously, and a part of an outer circumferential surface of the tail portion is exposed. The second coating layer is coated on the first coating layer continuously corresponding to the grip portion and covers the part of the outer circumferential surface of the tail portion exposed. A pattern portion is protrudingly disposed on the second coating layer, a first flange is radially formed on the second coating layer corresponding to the tail portion, and at least one passage is disposed on a circumferential face thereof and extends to the first coating layer. The third coating layer is at least coated on the second coating layer and covers the at least one passage, and at least an upper surface of the pattern portion and at least a part of the first flange are exposed.

To achieve the above and other objects, a coating method of a tool is further provided, including following steps of: preparing a main body, the main body including a head portion and a grip portion, an end of the grip portion connected with the head portion, the other end of the grip portion being a tail portion; arranging the main body into a first mold, the first mold partially abutting against the head portion and the tail portion respectively to form a first gap which extends from the head portion to the tail portion continuously and is surroundingly formed between the main body and the first mold; injecting a first coating material into the first mold and filling the first gap to form a first product having a first coating layer, the first product is formed with a first exposed region which corresponds to an abutting portion of the tail portion of the main body and the first mold and is uncovered by the first coating material; arranging the first product into a second mold, the second mold formed with a predetermined pattern corresponding to the grip portion and partially abutting against the first product to form a second gap which is surroundingly continuously formed between the first product and the second mold, the second gap at least partially located in an area between the second mold and the first product corresponding to the grip portion; injecting a second coating material into the second mold and filling the second gap to form a second product having a second coating layer, the second coating material coated on the first product continuously corresponding to the grip portion and covering the first exposed region, the second coating material is formed with a first flange radially corresponding to the tail portion, the second product is formed with a second exposed region in which corresponds to an abutting portion of the first coating layer and the second mold and is uncovered by the second coating material, and the second coating layer formed with a pattern portion corresponding to the predetermined pattern; arranging the second product into a third mold, the third mold at least partially abutting against the first flange so as to form a third gap which is surroundingly continuously formed between the second product and the third mold, and the third gap being at least partially corresponding to the second coating layer; injecting a third coating material into the third mold and filling the third gap to form a tool having a third coating layer, the third coating material coated on the second coating layer continuously and covering the second exposed region, and at least an upper surface of the pattern portion and at least a part of the first flange being uncovered by the third coating material.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 8 is cross-sectional drawing of the main body and the first mold of the preferred embodiment of the present invention;

FIG. 9 is a cross-sectional view of the preferred embodiment of the present invention, taken along line A-A in FIG. 8;

FIG. 10 is a cross-sectional drawing of the first product and the first mold of the preferred embodiment of the present invention;

FIG. 14 is a cross-sectional drawing of the second product and a third mold of the preferred embodiment of the present invention; and FIG. 15 is a cross-sectional drawing of the tool and the third mold of the preferred embodiment of the present invention.

DETAILED DESCRIPTION OF THE PREFERRED EMBODIMENTS

Figure 1:
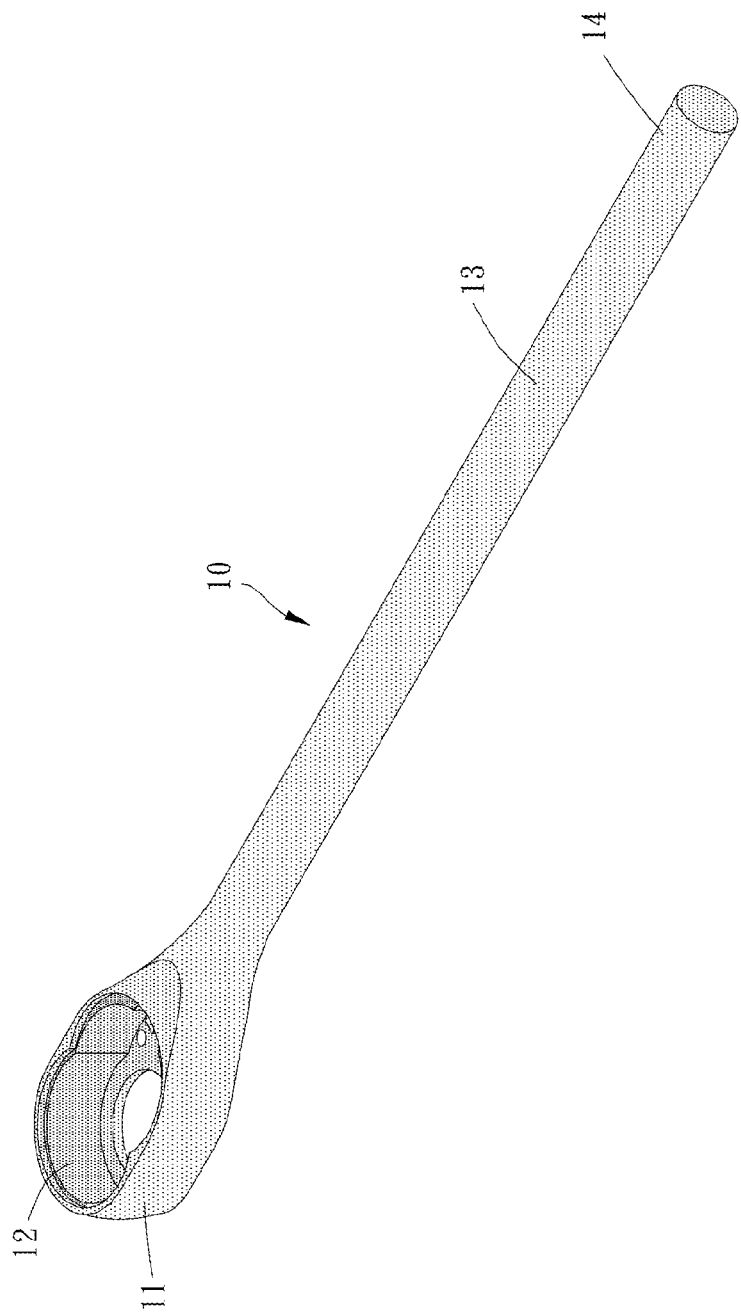
FIG. 1 is a perspective drawing of a main body of a preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 6 for a preferred embodiment of the present invention. A tool 1 includes a main body 10, a first coating layer 20, a second coating layer 30 and a third coating layer 40.

The main body 10 includes a head portion 11 and a grip portion 13. An end of the grip portion 13 is connected with the head portion 11, and the other end is a tail portion 14. In this embodiment, the head portion 11 is a head portion of a half-finished product of a ratchet wrench. The head portion 11 is surroundingly formed with a receiving slot 12. It is to be noted that the head portion varies in accordance with the types of tools, for example, the tool can be an opening wrench, a socket wrench or a screwdriver.

The first coating layer 20 is coated on the main body 10 from the head portion 11 to the tail portion 14 continuously, and a part of an outer circumferential face of the tail portion 14 is exposed. Specifically, the part of the outer circumferential face of the tail portion 14 exposed is a first exposed region 15. More specifically, the first coating layer 20 can protect the main body 10 and prevent the main body 10 from being abraded, and the tool 1 can present various perceptions in accordance with different materials of the first coating layer 20. In this embodiment, the first coating layer 20 is further formed with a fourth flange 22 radially between the head portion 11 and the tail portion 14 relatively, a second annular recession 24 between the fourth flange 22 and the head portion 11, a second flange 21 radially corresponding to the tail portion 14 and a first annular recession 23 between the fourth flange 22 and the second flange 21, and the first annular recession 23 partially exposes the outer circumferential face of the tail portion 14.

The second coating layer 30 is coated on the first coating layer 20 corresponding to the grip portion 13 continuously and covers the part of the outer circumferential face of the tail portion 14 exposed. The second coating layer 30 is protrudingly formed with a pattern portion 33, and a first flange 31 is radially formed around the second coating layer 30 corresponding to the tail portion 14. At least one passage 34 is disposed on a circumferential face of the second coating layer 30 and extends to the first coating layer 20.

In this embodiment, the second coating layer 30 is further formed with a third flange 32 radially between the head portion 11 and the tail portion 14 relatively, and the third flange 32 at least covers the fourth flange 22 partially and the second annular recession 24. Furthermore, the second annular recession 24 prevents the second coating layer 30 from peeling off, and the fourth flange 22 prevents the third flange 32 from falling downward when the third flange 32 is formed. In other embodiments, the first coating layer may be formed without the fourth flange and the second annular recession and may make the third flange formed in a predetermined position directly; or the first coating layer may only be formed with either of the fourth flange or the second annular recession to make the third flange at least cover the fourth flange partially and the second annular recession partially.

The first flange 31 at least covers the second flange 21 partially and the first annular recession 23 partially. It is to be noted that the second flange 21 has a function to support the first flange 31 to prevent the first flange 31 from falling downward when the first flange 31 is formed. In other embodiments, the first coating layer may be formed without the second flange and the first annular recession and may make the first flange formed in a predetermined position directly; or the first coating layer may only be formed with either of the second flange or the first annular recession to make the first flange at least cover the second flange partially and the first annular recession partially.

The third coating layer 40 is at least coated on the second coating layer 30 and covers the at least one passage 34, and at least an upper surface of the pattern portion 33 and a part of the first flange 31 are uncovered by the third coating layer 40 and exposed to the air. In this embodiment, the third flange 32 is at least partially exposed from an outer portion of the tool 1. In other embodiments, the third coating layer may cover the third flange directly to make the third flange unexposed from the outer portion; or the second coating layer may be formed without the third flange to make the third coating layer connected with the head portion directly. The pattern portion 33 radially projects outwardly and includes at least one enclosed loop structure 37, an interior of the at least one enclosed loop structure 37 is filled with the third coating material 40, and the at least one enclosed loop structure 37 is uncovered by the third coating material 40 and exposed to the air.

In this embodiment, the third coating layer 40 is softer than the first coating layer 20 and the second coating layer 30 to make a user feel more comfortable when s/he grips on the tool 1. In addition, the first coating layer 20 has a first color, the second coating layer 30 has a second color, the third coating layer 40 has a third color, and the second color and the third color are different; therefore, the pattern portion 33 can be more eye-catching. It is understandable that the first, second and third colors may be different from one another or be the same.

A coating method of a tool is further provided, including following steps of:

Please refer to FIGS. 7 to 10. A main body 10 is prepared. The main body 10 includes a head portion 11 and a grip portion 13. An end of the grip portion 13 is connected with the head portion 11, and the other end of the grip portion 13 is a tail portion 14. Furthermore, the head portion 11 is surroundingly formed with a receiving slot 12 provided for a ratchet wrench to be assembled thereto and for connecting with molds.

The main body 10 is arranged into a first mold 50. The first mold 50 partially abuts against the head portion 11 and the tail portion 14 respectively to form a first gap 52 which extends from the head portion 11 to the tail portion 14 continuously and is surroundingly formed between the main body 10 and the first mold 50. Furthermore, the head portion 11 abuts against the first mold 50 via the receiving slot 12, and the first mold is connectable with different positions of the head portion in accordance with different tools.

Figures 2, 3:
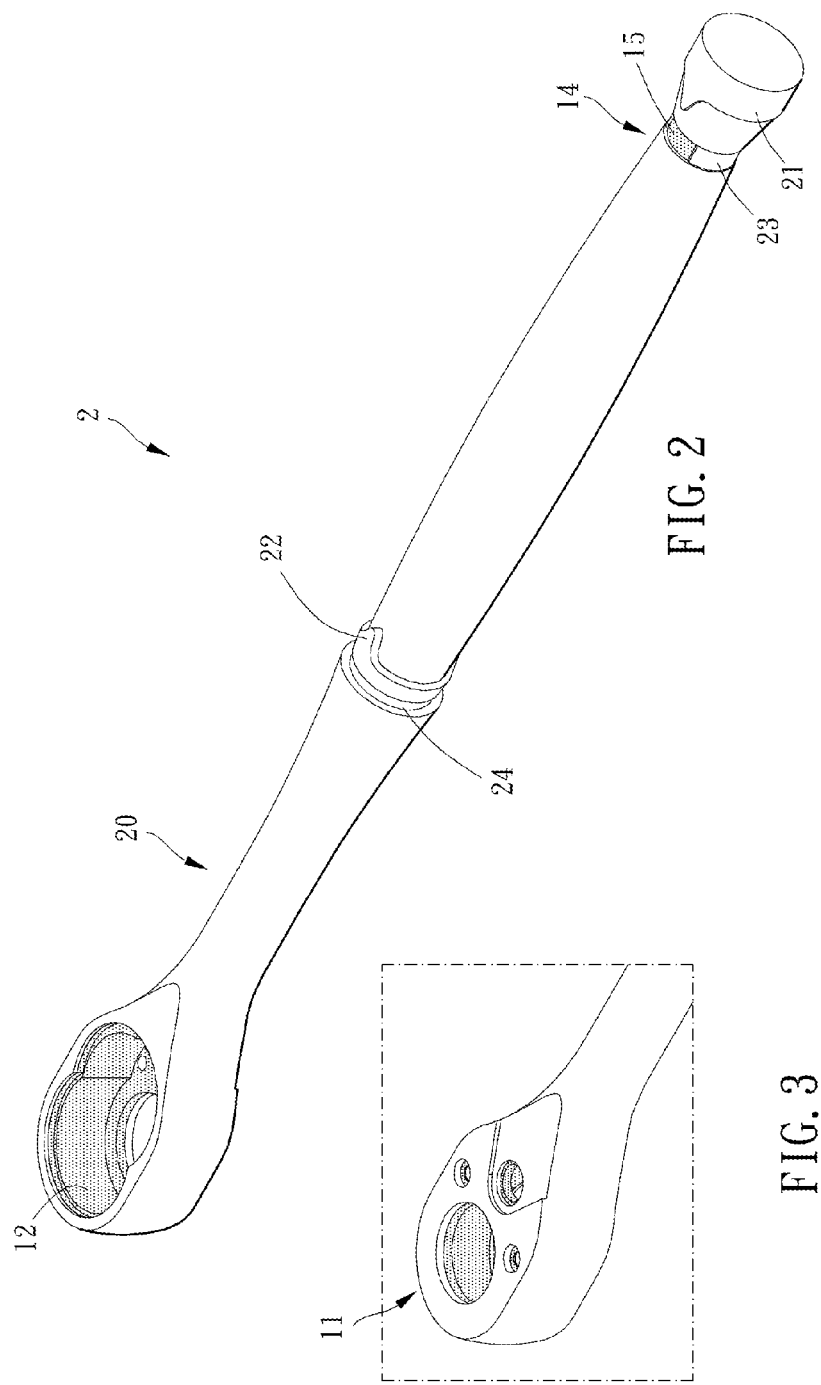
FIG. 2 is a perspective drawing of a first product of the preferred embodiment of the present invention.
FIG. 3 is a partial enlarged perspective drawing of the first product of the preferred embodiment of the present invention viewed from another perspective.

A first coating material 25 is injected into the first mold 50 and fills the first gap 52 to form a first product 2 having a first coating layer 20 (as shown in FIG. 2). The first product 2 is formed with a first exposed region 15 which corresponds to an abutting portion of the tail portion 14 of the main body 10 and the first mold 50 and is uncovered by the first coating material 25.

Specifically, the first mold 50 includes at least one fixing portion 51, and the at least one fixing portion 51 partially abuts against the main body 10. When the first coating material 25 is injected into the first mold 50, a first annular recession 23 is formed radially corresponding to the at least one fixing portion 51, and the first exposed region 15 is formed on an area of the first product 2 which the at least one fixing portion 51 abuts against the main body 10 and is uncovered by the first coating material 25. In this embodiment, the first mold 50 abuts against the main body 10 via the two fixing portions 51 corresponding to the tail portion 14. It is understandable that the main body is abuttable via only one the fixing portion to make the main body positioned in the first mold. It is to be noted that by using this way of abutting, only an injecting opening is need for injecting the first coating material 25.

Figure 11:
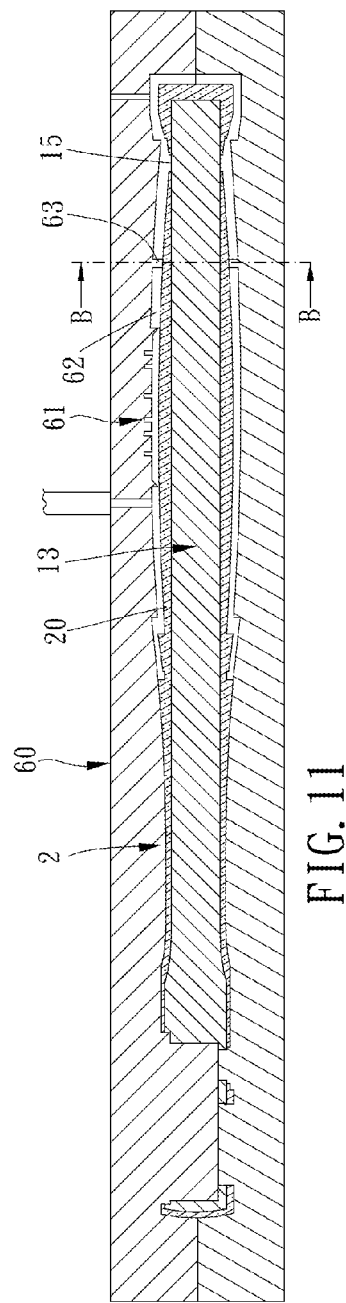
FIG. 11 is a cross-sectional drawing of the first product and a second mold of the preferred embodiment of the present invention.
Figure 12:
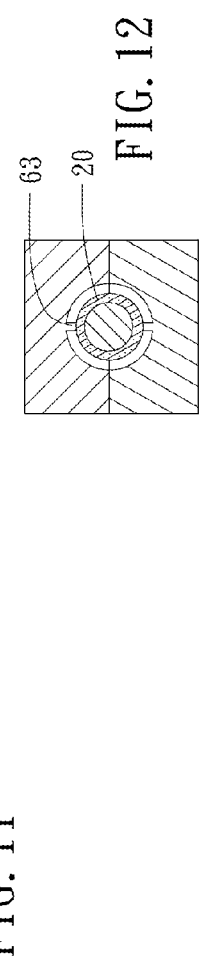
FIG. 12 is a cross-sectional drawing of the preferred embodiment of the present invention, taken along line B-B in FIG. 11.
Figure 13:
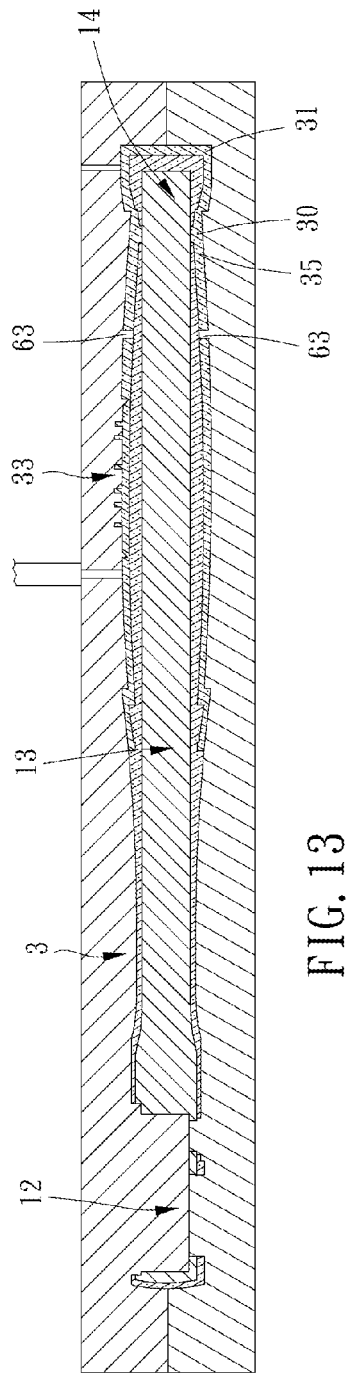
FIG. 13 is a cross-sectional drawing of the second product and the second mold of the preferred embodiment of the present invention.

Please refer to FIGS. 11 to 13. The first product 2 is arranged into a second mold 60. The second mold 60 is formed with a predetermined pattern 61 corresponding to the grip portion 13 and partially abuts against the first product 2 to form a second gap 62 which is surroundingly continuously formed between the first product 2 and the second mold 60.

Figure 4:
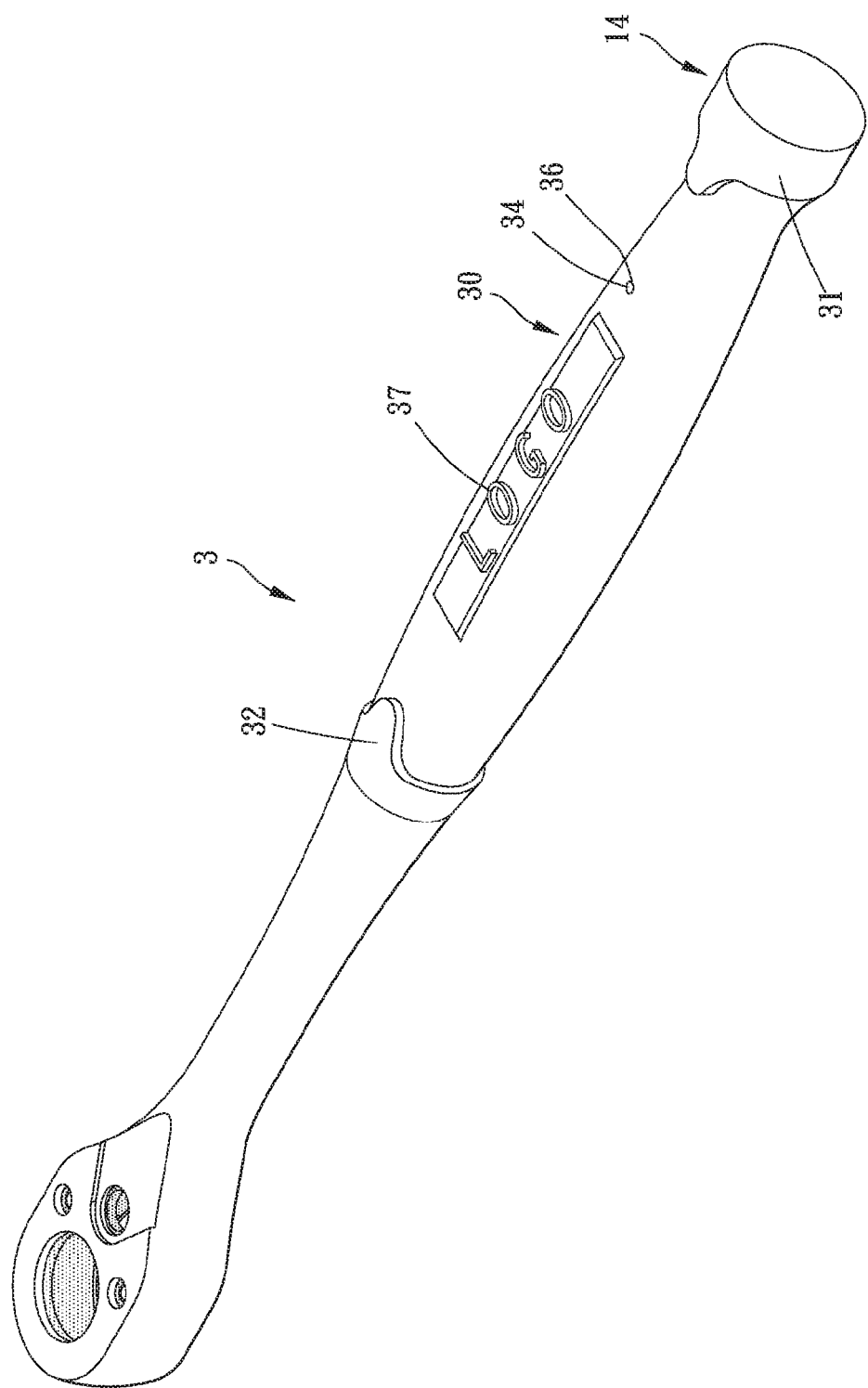
FIG. 4 is a perspective drawing of a second product of the preferred embodiment of the present invention.

A second coating material 35 is injected into the second mold 60 and fills the second gap 62 to form a second product 3 (as shown in FIG. 4) having a second coating layer 30. The second coating material 35 is coated on the first product 2 continuously corresponding to the grip portion 13 and covers the first exposed region 15, the second coating material 35 is formed with a first flange 31 radially corresponding to the tail portion 14, the second product 3 is formed with a second exposed region 36 which is in an abutting portion of the first coating layer 20 and the second mold 60 and uncovered by the second coating material 35, and the second coating layer 30 is formed with a pattern portion 33 corresponding to the predetermined pattern 61. More specifically, the second mold 60 includes at least one supporting rod 63, and the at least one supporting rod 63 abuts against the first coating layer 20. When the second coating material 35 is injected into the second mold 60, the second exposed region 36 is formed on an area which the at least one supporting rod 63 abuts against the first coating layer 20 and is uncovered by the second coating material 35. In this embodiment, the second mold 60 abuts against the first coating layer 20 via the supporting rods 63 on two opposite sides thereof, and the second mold can also abut against the first coating layer via the supporting rods in other numbers or in different directions. It is understandable that the at least one supporting rod can abut against other parts of the first product.

Please refer to FIGS. 14 and 15. The second product 3 is arranged into the third mold 70. The third mold 70 at least partially abuts against the first flange 31 so as to form a third gap 71 which is surroundingly continuously formed between the second product 3 and the third mold 70, and the third gap 71 is at least partially corresponding to the second coating layer 30. More specifically, the third mold 70 abuts against the first flange 31 and the receiving slot 12.

Figure 5:
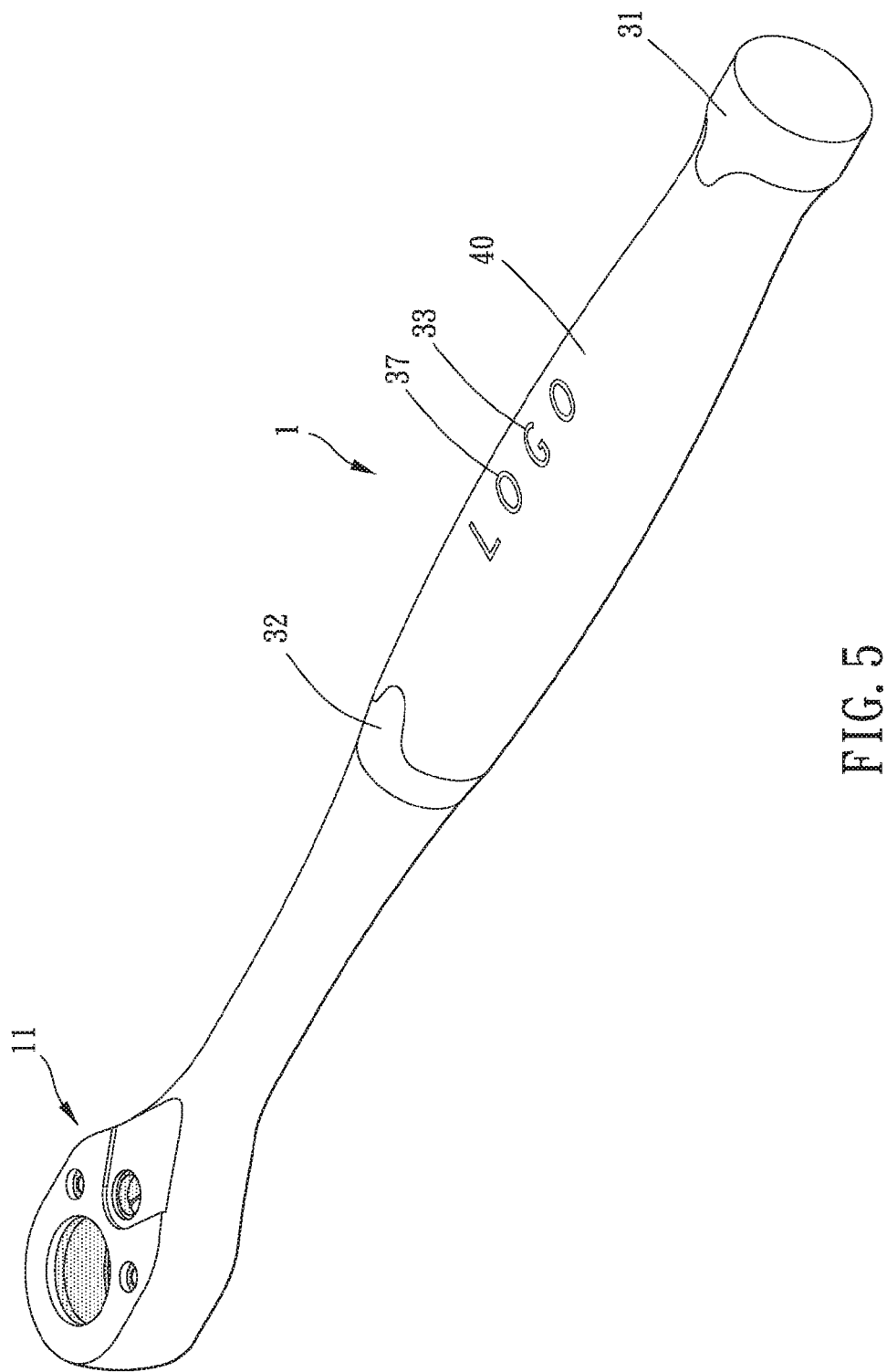
FIG. 5 is a perspective drawing of a tool of the preferred embodiment of the present invention.
Figure 6:
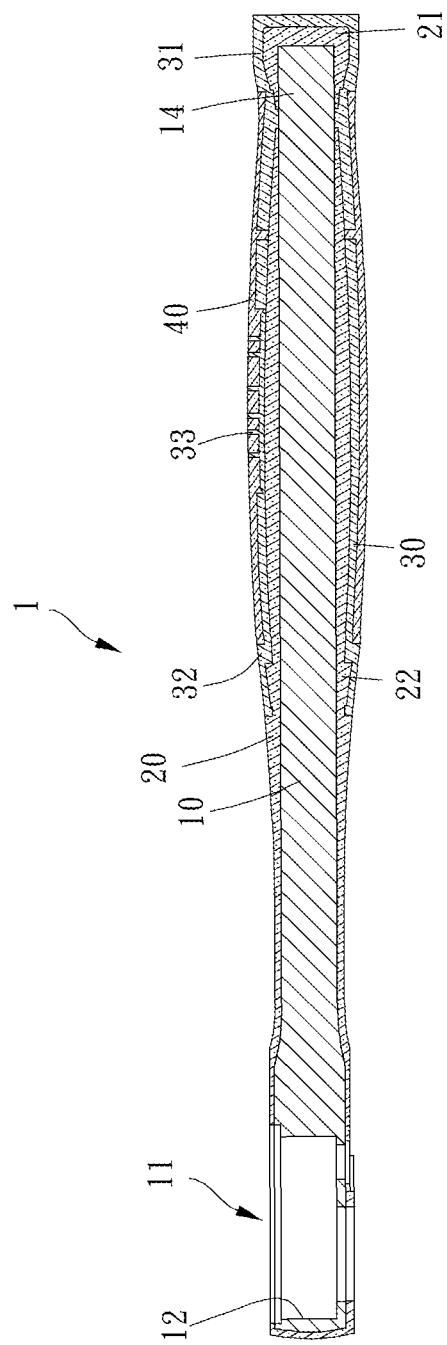
FIG. 6 is a cross-sectional drawing of the preferred embodiment of the present invention.
Figure 7:
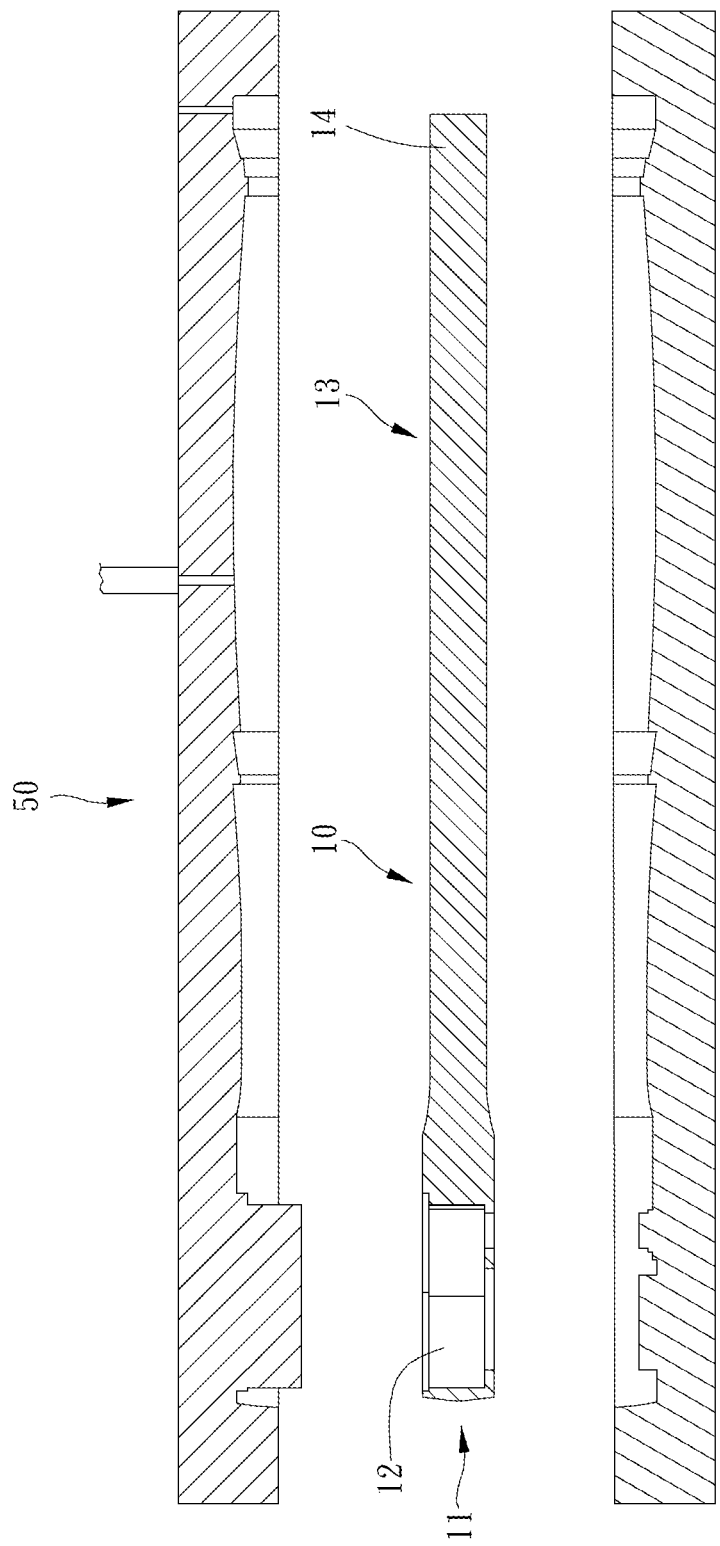
FIG. 7 is a breakdown drawing of the main body and a first mold of the preferred embodiment of the present invention.

A third coating material 41 is injecting into the third mold 70 and fills the third gap 71 to form a tool 1 (as shown in FIG. 5) having a third coating layer 40. The third coating material 41 is coated on the second coating layer 30 continuously and covers the second exposed region 36 (that is, the passage 34), and at least an upper surface of the pattern portion 33 and at least a part of the first flange 31 are uncovered by the third coating material 41.

Given the above, in the present invention, the first coating layer is coated on the main body from the head portion to the tail portion thoroughly; therefore, compared with the conventional tools whose head portions are exposed, the main body of the present invention can be protected from abrasion.

In addition, the pattern portion of the tool is formed with the second coating layer directly, and the upper surface of the pattern portion is exposed after the second coating layer is coated by the third coating layer. The pattern portion of this type of tool is less prone to abrasion after long-term use.

While we have shown and described various embodiments in accordance with the present invention, it should be clear to those skilled in the art that further embodiments may be made without departing from the scope of the present invention.

What is claimed is:
1. A tool, including:
a main body, including a head portion and a grip portion, an end of the grip portion connected with the head portion, the other end of the grip portion being a tail portion; a first coating layer, coated on the main body from the head portion to the tail portion continuously, a part of an outer circumferential face of the tail portion being uncovered by the first coating layer;
a second coating layer, coated on the first coating layer continuously corresponding to the grip portion and covering the part of the outer circumferential face of the tail portion which is uncovered by the first coating layer, a pattern portion protrudingly disposed on the second coating layer, a first flange radially formed around the second coating layer corresponding to the tail portion, and at least one passage disposed radially through the second coating layer and extending to the first coating layer;
a third coating layer, at least coated on the second coating layer and covering the at least one passage, at least an upper surface of the pattern portion being uncovered by the third coating layer and exposed to the air, at least a part of the first flange being uncovered by the third coating layer exposed to the air;
wherein the pattern portion radially projects outwardly and includes at least one enclosed loop structure, an interior of the at least one enclosed loop structure is filled with the third coating material, and the at least one enclosed loop structure is uncovered by the third coating material and exposed to the air.

2. The tool of claim 1, wherein the first coating layer is further formed with a second flange radially corresponding to the tail portion, and the first flange at least covers the second flange partially.

3. The tool of claim 1, wherein the second coating layer is further formed with a third flange radially between the head portion and the tail portion relatively.

4. The tool of claim 3, wherein the third flange is at least partially uncovered by the third coating layer.

5. The tool of claim 3, wherein the first coating layer is further formed with a fourth flange radially between the head portion and the tail portion relatively, and the third flange at least covers the fourth flange partially.

6. The tool of claim 3, wherein the first coating layer is further formed with a second annular recession radially between the head portion and the tail portion relatively, the third flange at least partially covers the second annular recession, and the third flange is at least partially uncovered by the third coating layer.

7. The tool of claim 1, wherein the first coating layer is further formed with a fourth flange radially between the head portion and the tail portion relatively and a second annular recession between the fourth flange and the head portion, the second coating layer is further formed with a third flange radially between the head portion and the tail portion relatively, the third flange at least covers the fourth flange partially and the second annular recession, and the third flange is at least partially exposed uncovered by the third coating layer.

8. The tool of claim 1, wherein the first coating layer is further formed with a first annular recession radially corresponding to the tail portion, and the outer circumferential face of the tail portion which is uncovered by the first coating layer is disposed within the first annular recession.

9. The tool of claim 1, wherein the third coating layer is softer than the first coating layer and the second coating layer, the first coating layer has a first color, the second coating layer has a second color, the third coating layer has a third color, and the second color and the third color are different.

10. A coating method of a tool, including following steps of:
preparing a main body, the main body including a head portion and a grip portion, an end of the grip portion connected with the head portion, the other end of the grip portion being a tail portion;
arranging the main body into a first mold, the first mold partially abutting against the head portion and the tail portion respectively so as to form a first gap which extends from the head portion to the tail portion continuously and is surroundingly formed between the main body and the first mold;
injecting a first coating material into the first mold and filling the first gap to form a first product having a first coating layer, the first product formed with a first exposed region which corresponds to an abutting portion of the tail portion of the main body and the first mold and is uncovered by the first coating material;
arranging the first product into a second mold, the second mold formed with a predetermined pattern corresponding to the grip portion and partially abutting against the first product so as to form a second gap which is surroundingly continuously formed between the first product and the second mold, the second gap at least partially located between the second mold and the first product corresponding to the grip portion;
injecting a second coating material into the second mold and filling the second gap to form a second product having a second coating layer, the second coating material coated on the first product continuously corresponding to the grip portion and covering the first exposed region, the second coating material formed with a first flange radially corresponding to the tail portion, the second product formed with a second exposed region which corresponds to an abutting portion of the first coating layer and the second mold and is uncovered by the second coating material, at least one passage disposed radially through the second coating layer and extending to the first coating layer, and the second coating layer formed with a pattern portion corresponding to the predetermined pattern, the pattern portion radially projects outwardly and includes at least one enclosed loop structure;
arranging the second product into a third mold, the third mold at least partially abutting against the first flange so as to form a third gap which is surroundingly continuously formed between the second product and the third mold, and the third gap being at least partially corresponding to the second coating layer;
injecting a third coating material into the third mold and filling the third gap to form a tool having a third coating layer, the third coating material coated on the second coating layer continuously and covering the second exposed region, the third coating material filling up the at least one passage, and at least an upper surface of the pattern portion and at least a part of the first flange being uncovered by the third coating material and exposed to the air, an interior of the at least one enclosed loop structure being filled with the third coating material, the at least one enclosed loop structure being uncovered by the third coating material and exposed to the air.

11. The coating method of claim 10, wherein the head portion is surroundingly formed with a receiving slot, and the receiving slot is provided for abutting against the first, second or third molds.

12. The coating method of claim 10, wherein the first mold includes at least one fixing portion, the at least one fixing portion partially abuts against the main body, when the first coating material is injected into the first mold, a first annular recession is radially disposed around an area of the first product corresponding to the at least one fixing portion, and the first exposed region is formed on an area of the first product which the at least one fixing portion abuts against the main body and is uncovered by the first coating material.

13. The coating method of claim 10, wherein the second mold includes at least one supporting rod, the at least one supporting rod abuts against the first coating layer, when the second coating material is injected into the second mold, the second exposed region is formed on an area of the second product where the at least one supporting rod abuts against the first coating layer and where is uncovered by the second coating material.

* * * * *